(12) United States Patent
Nakazato et al.

(10) Patent No.: US 10,017,103 B2
(45) Date of Patent: Jul. 10, 2018

(54) VEHICLE LIGHTING APPARATUS

(71) Applicant: Stanley Electric Co., Ltd., Tokyo (JP)

(72) Inventors: Yoshiaki Nakazato, Tokyo (JP); Takahiko Tokiwa, Tokyo (JP)

(73) Assignee: STANLEY ELECTRIC CO., LTD., Tokyo (JP)

(*) Notice: Subject to any disclaimer, the term of this patent is extended or adjusted under 35 U.S.C. 154(b) by 8 days.

(21) Appl. No.: 15/260,071

(22) Filed: Sep. 8, 2016

(65) Prior Publication Data
US 2017/0088034 A1    Mar. 30, 2017

(30) Foreign Application Priority Data
Sep. 24, 2015 (JP) .................................. 2015-186547

(51) Int. Cl.
| | |
|---|---|
| B60Q 1/00 | (2006.01) |
| F21S 41/19 | (2018.01) |
| F21S 41/14 | (2018.01) |
| F21S 41/43 | (2018.01) |
| F21S 45/49 | (2018.01) |
| F21S 45/43 | (2018.01) |
| F21S 41/16 | (2018.01) |
| F21Y 115/30 | (2016.01) |
| F21S 41/32 | (2018.01) |

(52) U.S. Cl.
CPC ............ B60Q 1/0023 (2013.01); F21S 41/14 (2018.01); F21S 41/16 (2018.01); F21S 41/192 (2018.01); F21S 41/43 (2018.01); F21S 45/43 (2018.01); F21S 45/49 (2018.01); *F21S 41/321* (2018.01); *F21Y 2115/30* (2016.08)

(58) Field of Classification Search
CPC ........ B60Q 1/0023; F21S 48/115; F21K 9/64; F21V 23/0492; F21W 2101/10; F21Y 2115/30

USPC ................................................ 362/459–549
See application file for complete search history.

(56) References Cited

U.S. PATENT DOCUMENTS

2014/0168940 A1* 6/2014 Shiomi ................ B60Q 1/0023
                                                362/84
2015/0323148 A1* 11/2015 Tsuda .................. F21S 48/1721
                                                362/510

FOREIGN PATENT DOCUMENTS

DE    10 2014 202 943 A1    8/2015
EP    2 781 408 A2    9/2014
(Continued)

OTHER PUBLICATIONS

The extended European search report for the related European Patent Application No. 16188256.8 dated Jan. 26, 2017.

*Primary Examiner* — William Carter
(74) *Attorney, Agent, or Firm* — Kenealy Vaidya LLP

(57) ABSTRACT

A vehicle lighting apparatus includes: a light source device that includes a semiconductor laser which emits laser light and a wavelength conversion member which converts the wavelength of at least part of the laser light and that emits, from a light emission part, light from the wavelength conversion member; a reflection member that reflects light emitted from the light emission part of the light source device in a vehicle frontward direction as parallel light; a light shield member that blocks light which is emitted in the vehicle frontward direction from the light emission part and which is not incident on the reflection member; and a light detection part that is arranged at a vehicle rearward positon of the reflection member and detects part of the light emitted from the light emission part.

15 Claims, 10 Drawing Sheets

(56) References Cited

FOREIGN PATENT DOCUMENTS

| EP | 2 963 337 A1 | 1/2016 |
| JP | 2014-180886 A | 9/2014 |
| JP | 2015-69952 A | 4/2015 |
| WO | 2016/151016 A1 | 9/2016 |

* cited by examiner (a)

(b)

VEHICLE LIGHTING APPARATUS

CROSS-REFERENCE TO RELATED APPLICATION

Priority is claimed on Japanese Patent Application No. 2015-186547, filed on Sep. 24, 2015, the contents of which are incorporated herein by reference.

BACKGROUND

Field of the Invention

The present invention relates to a vehicle lighting apparatus.

Background

In the related art, a vehicle lighting apparatus including a light emitting element, a reflector that reflects light emitted from the light emitting element, and a photodiode that detects part of the light emitted from the light emitting element is known (for example, refer to Japanese Unexamined Patent Application, First Publication No. 2014-180886). In the vehicle lighting apparatus, the light emitting element is controlled to be driven based on an intensity of light detected by the photodiode.

SUMMARY

However, in the vehicle lighting apparatus described above, since the photodiode is positioned in a vehicle frontward direction of the light emitting element, an optical system by which light is guided to the photodiode is formed at a front end of the reflector, and thereby, the size of the reflector is increased. Therefore, the size of the vehicle lighting apparatus including the reflector is increased.

An object of an aspect of the present invention is to provide a vehicle lighting apparatus having a reduced size.

An aspect of the present invention provides a vehicle lighting apparatus including: a light source device that includes a semiconductor laser which emits laser light and a wavelength conversion member which converts the wavelength of at least part of the laser light and that emits, from a light emission part, light from the wavelength conversion member; a reflection member that reflects light emitted from the light emission part of the light source device in a vehicle frontward direction as parallel light; a light shield member that blocks light which is emitted in the vehicle frontward direction from the light emission part and which is not incident on the reflection member; and a light detection part that is arranged at a vehicle rearward positon of the reflection member and detects part of the light emitted from the light emission part.

According to the vehicle lighting apparatus of the aspect, light from the light source device is directly detected by the light detection part that is arranged at the vehicle rearward positon of the reflection member, and therefore, it is unnecessary to form an optical system such as a reflection surface on the reflection member as in a structure in which the light detection part is arranged at a vehicle frontward positon of the reflection member. Accordingly, the size of the reflection member can be reduced, and therefore, the size of the vehicle lighting apparatus can be reduced.

In the above-described vehicle lighting apparatus, the light detection part may be arranged at a more vehicle rearward position of the light source device than the light shield member in a light emission direction in which the parallel light is emitted.

According to the configuration, the light detection part can effectively use light that cannot be used as a fundamental light distribution pattern (high beam light distribution pattern) without wasting the light without affecting the light amount of the fundamental light distribution pattern.

In the above-described vehicle lighting apparatus, a first opening may be formed on the reflection member at a position facing the light detection part.

According to the configuration, the light detection part can well detect the light emitted from the light source device via the first opening.

In the above-described vehicle lighting apparatus, the light shield member may be arranged at a vehicle frontward position of the first opening in the light emission direction and may be arranged at an upper position than the first opening in a vertical direction that intersects with the light emission direction.

According to the configuration, the light shield member can prevent disturbance light from being directly incident on the light detection part via the first opening.

The above-described vehicle lighting apparatus may further include: a cover member that covers the light detection part, wherein a second opening that transmits part of the light emitted from the light emission part may be formed on the cover member.

According to the configuration, the cover member blocks disturbance light, and therefore, the S/N ratio of the light detection part can be improved.

In the above-described vehicle lighting apparatus, the light detection part may be arranged at a position on which, among the light emitted from the light emission part, light having an angle of 70 to 85° with respect to a normal direction of a light emission surface in the light emission part is incident.

According to the configuration, light (light having an angle of 70 to 85° with respect to the normal direction of the light emission surface) that cannot be used as a fundamental light distribution pattern even when the light is reflected at the reflection member is used for detection at the light detection part, and therefore, it is possible to effectively use light without affecting the light amount of the fundamental light distribution pattern.

The above-described vehicle lighting apparatus may further include: a heat release member that releases heat generated from the light source device, wherein the light detection part may be supported at a vehicle rearward position of the reflection member in the heat release member.

According to the configuration, it is possible to efficiently discharge the heat generated at the light source device by the heat release member. Further, the light detection part is arranged at a position away from the reflection member, and therefore, it is possible to reduce the impact of disturbance light other than the light emitted from the light source device.

The above-described vehicle lighting apparatus may further include: a control device that controls the light source device to be driven based on a detection result of the light detection part.

According to the configuration, even when an abnormality occurs in the light source device, the control device can control the semiconductor laser not to emit laser light. Accordingly, the laser light is reflected at the reflection member, and it is possible to prevent the laser light from being externally emitted.

According to aspects of the present invention, it is possible to reduce the size of a vehicle lighting apparatus.

Figure 2:
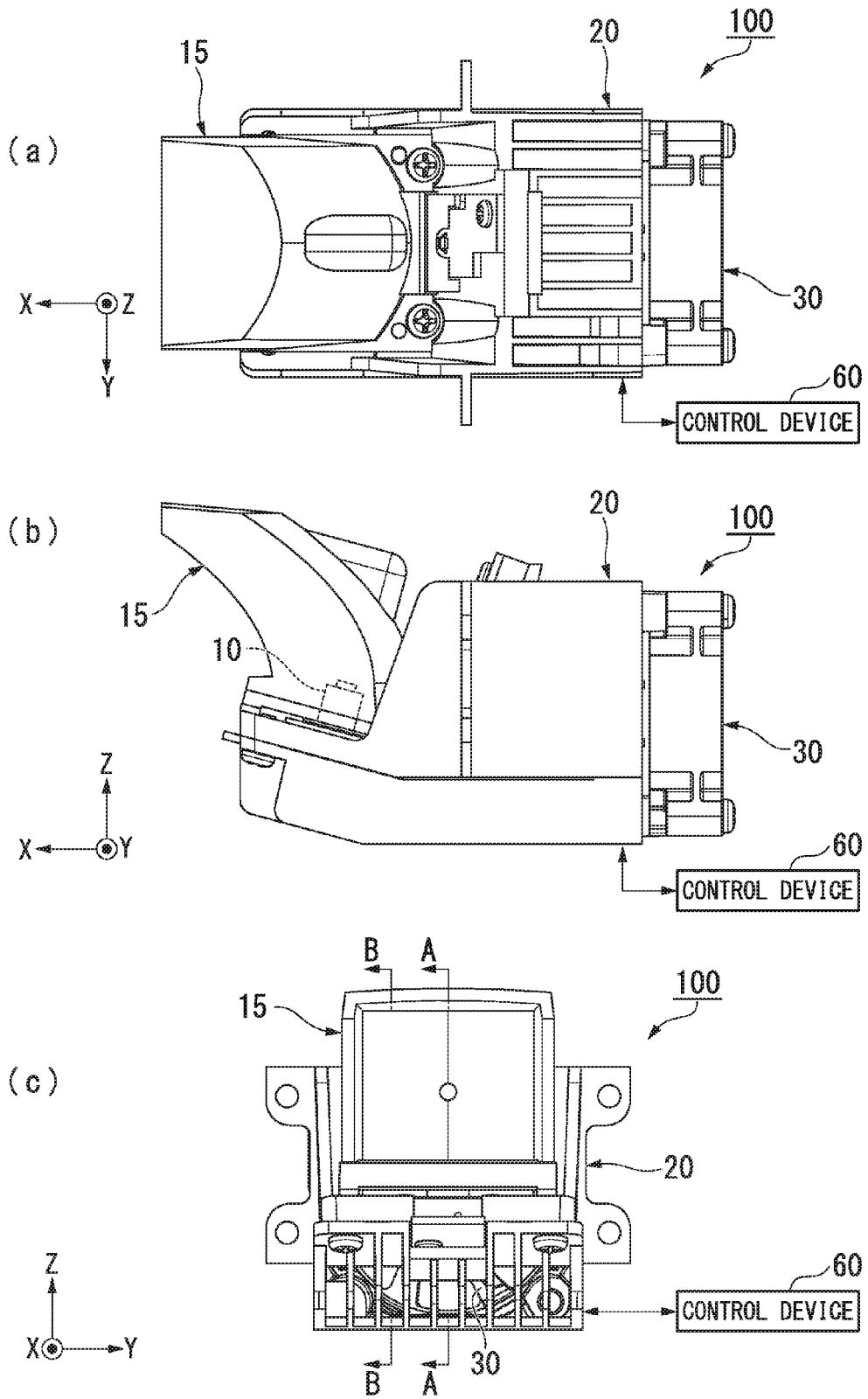

Part (a) of FIG. 2 is a plan view of the vehicle lighting apparatus, part (b) of FIG. 2 is a lateral view of the vehicle lighting apparatus, and part (c) of FIG. 2 is a front view of the vehicle lighting apparatus.

Figure 3:
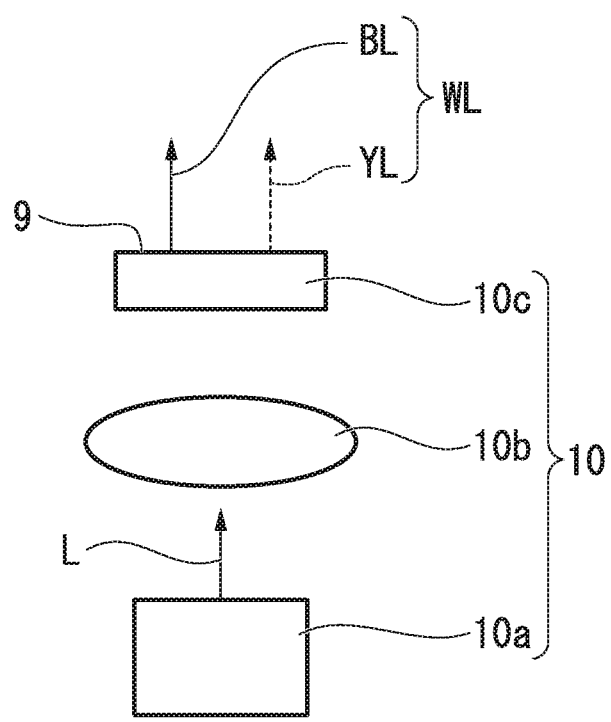

FIG. 3 is a cross-sectional view showing a schematic configuration of a light source device.

Figure 4:
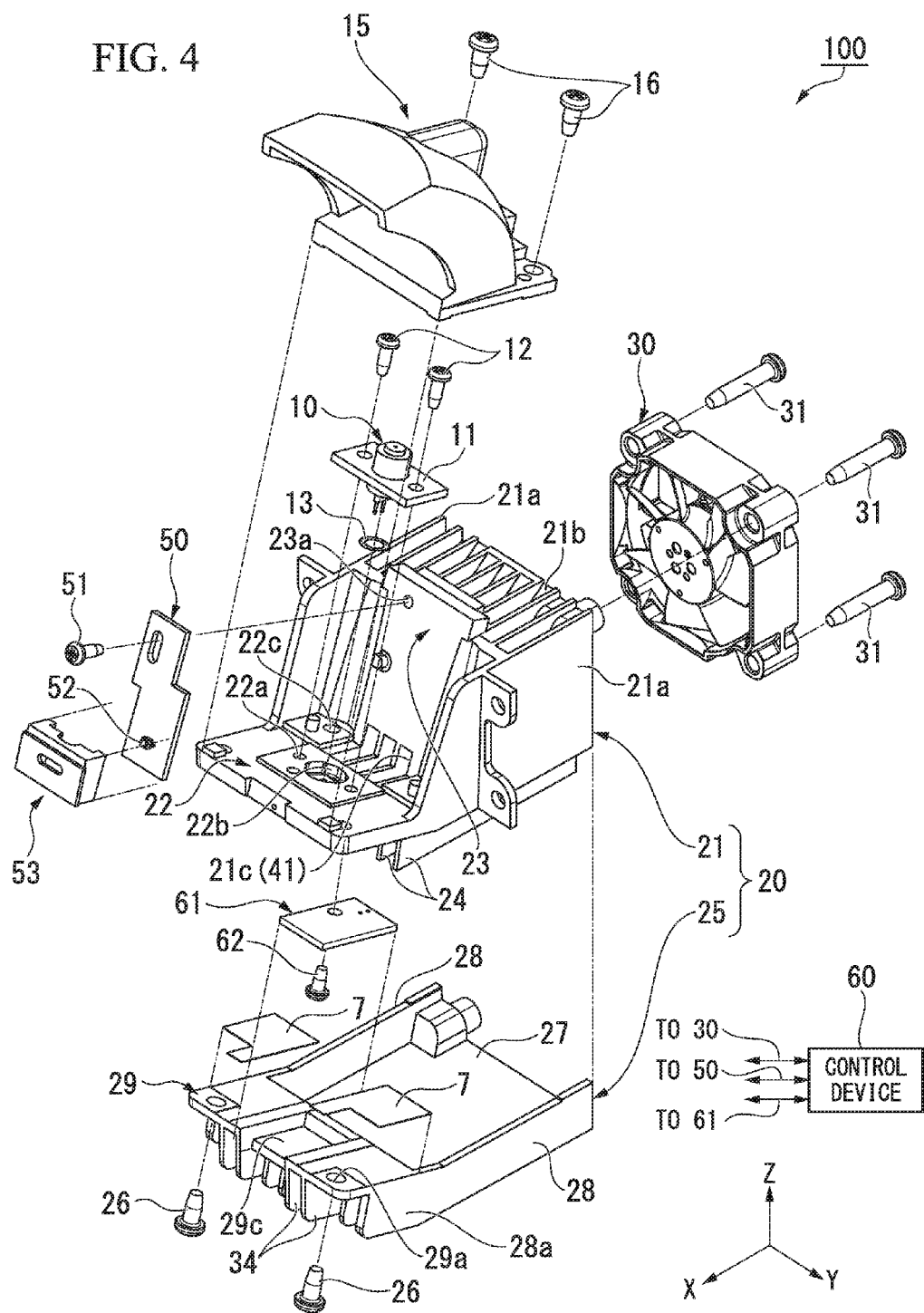

FIG. 4 is an exploded perspective view of the vehicle lighting apparatus.

Figure 5:
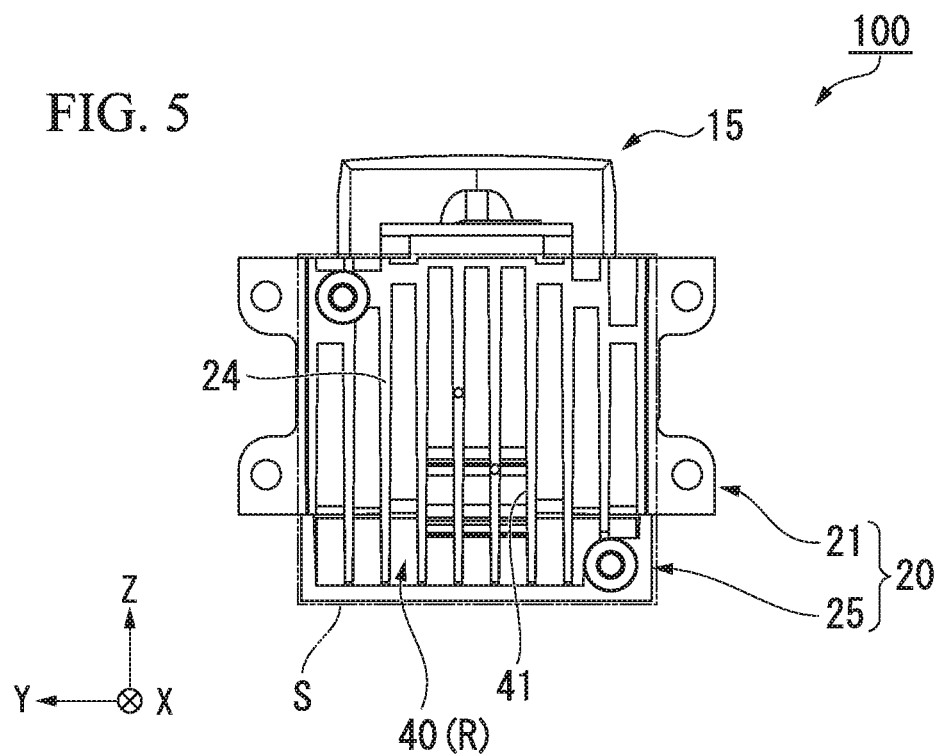

FIG. 5 is a view of the vehicle lighting apparatus seen from the vehicle backward direction.

Figure 6:
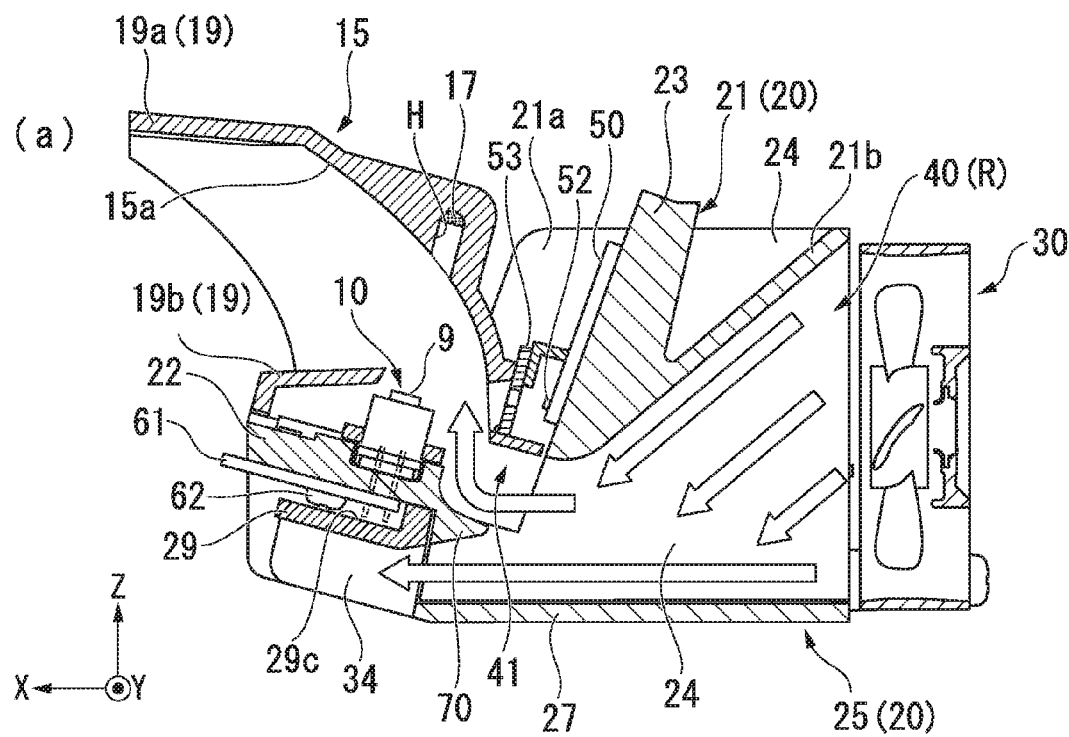
Figure 6:
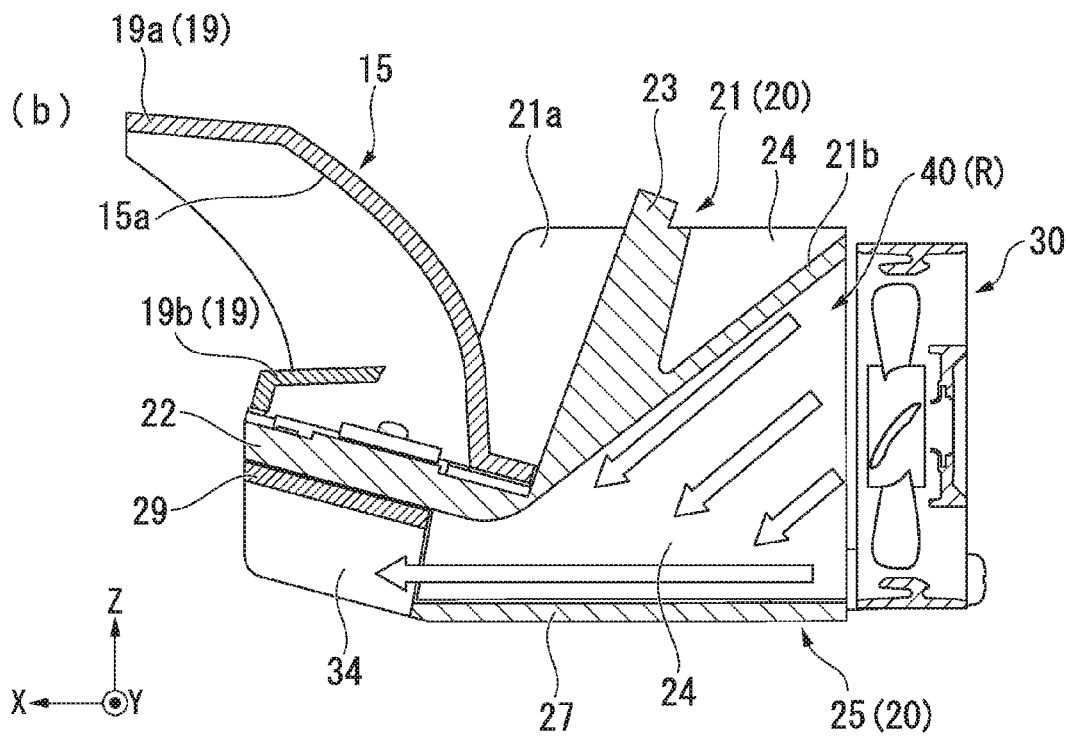

Part (a) of FIG. 6 is a cross-sectional view on the A-A arrow line of part (c) of FIG. 2, and part (b) of FIG. 6 is a cross-sectional view on the B-B arrow line of part (c) of FIG. 2.

Figure 7:
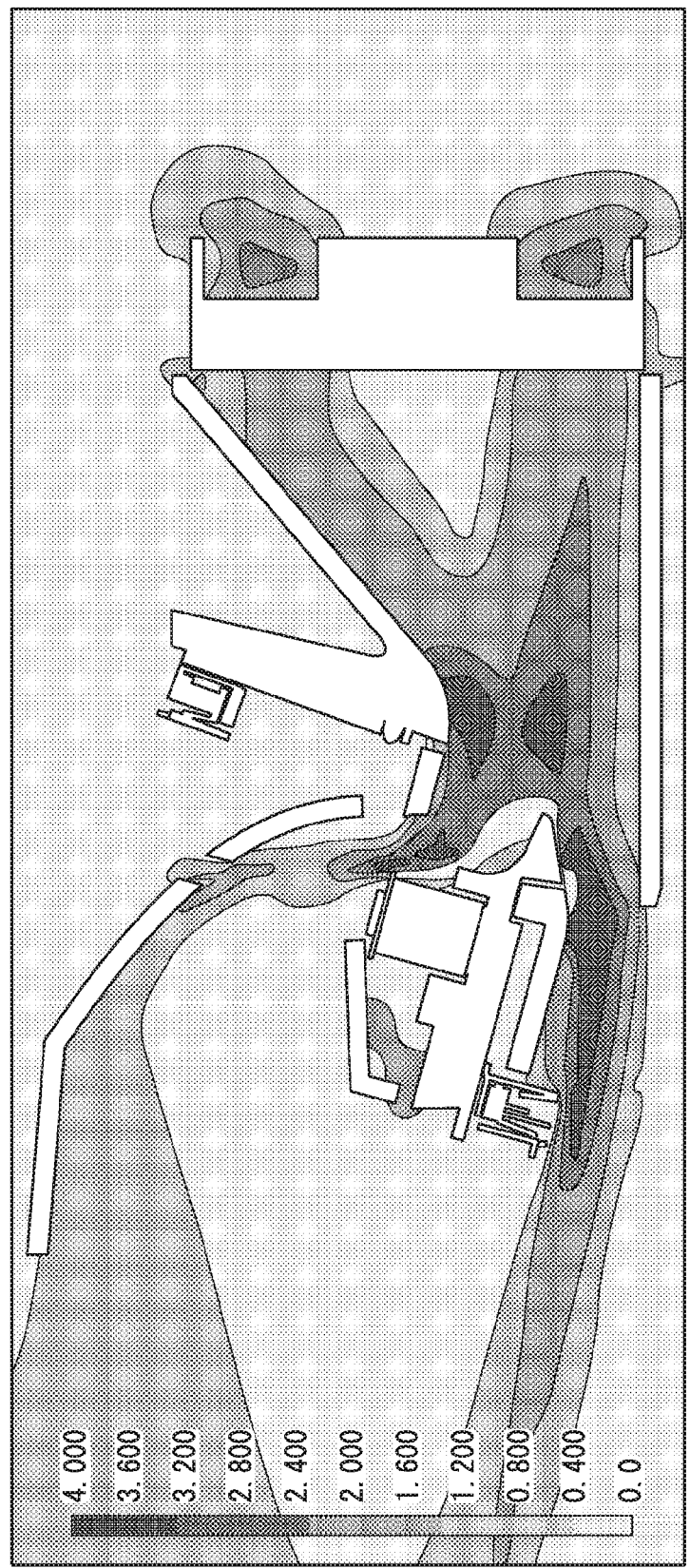

FIG. 7 is a view showing a simulation result of a wind speed distribution corresponding to part (a) of FIG. 6.

Figure 8:
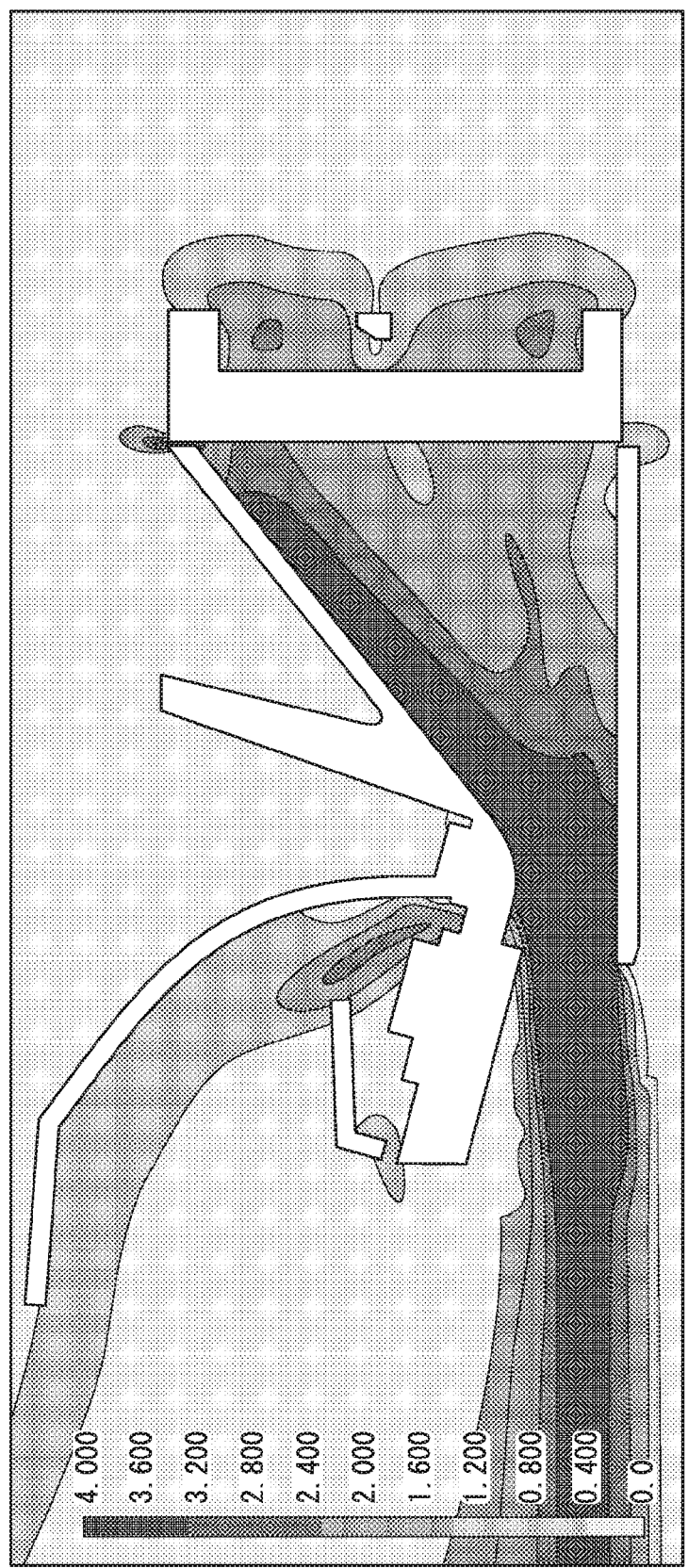

FIG. 8 is a view showing a simulation result of a wind speed distribution corresponding to part (b) of FIG. 6.

Figure 9:
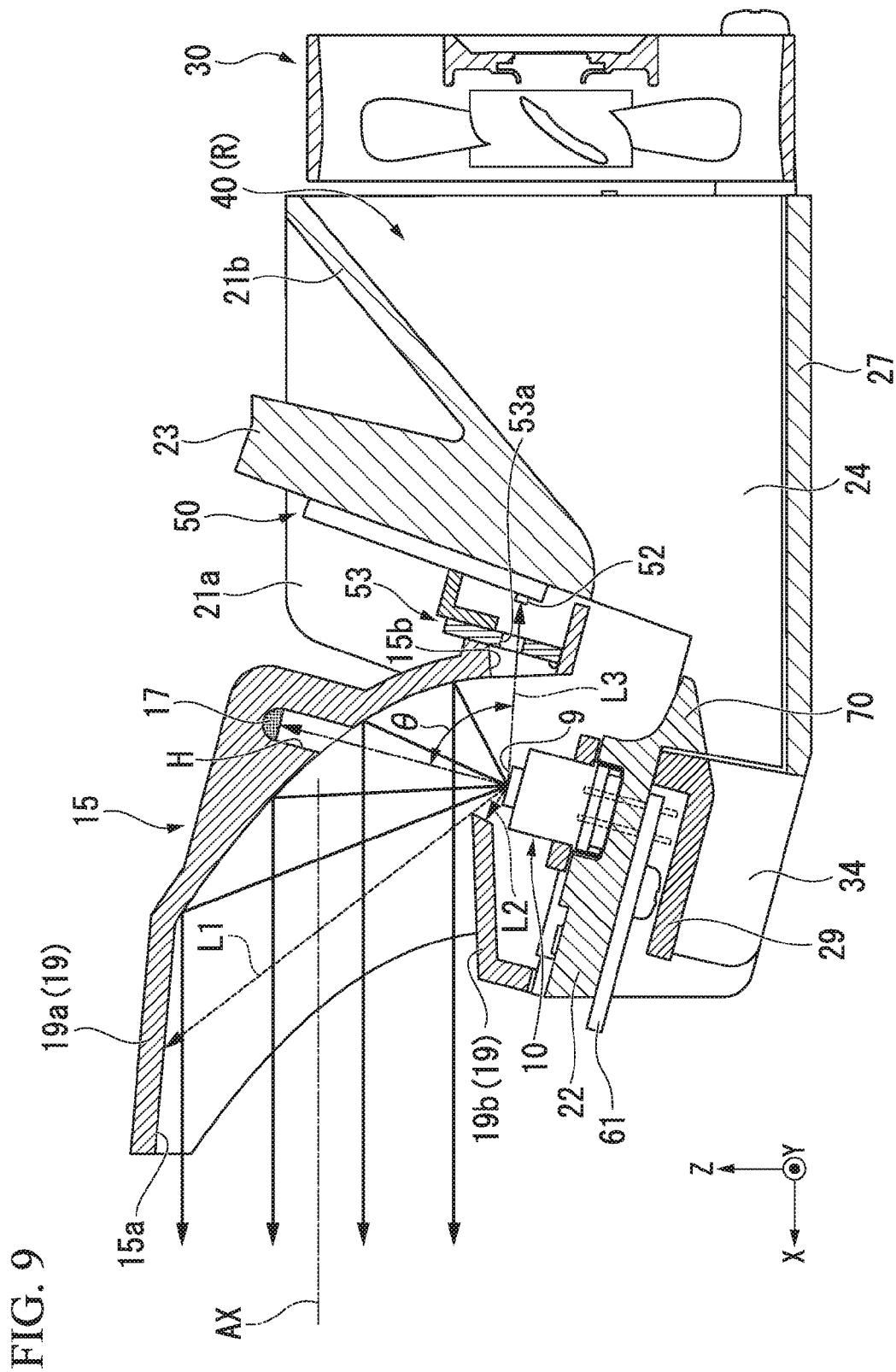

FIG. 9 is a cross-sectional view showing a main part configuration in the vicinity of a reflector.

Figure 10:
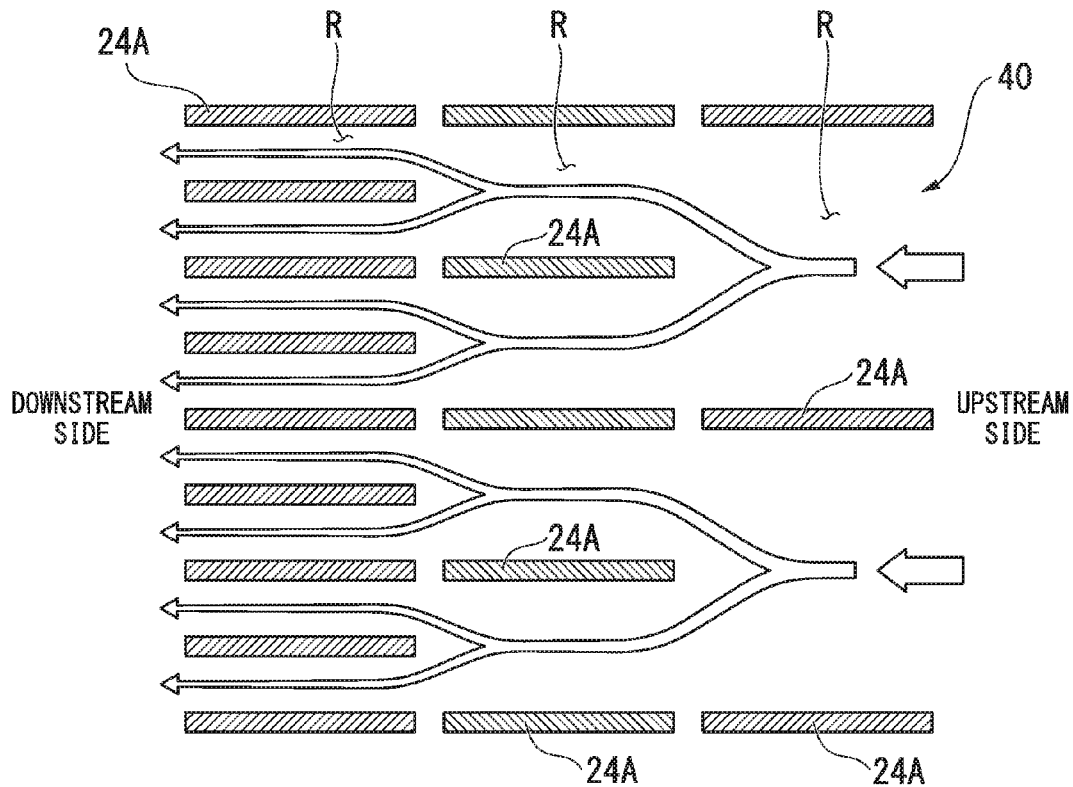

FIG. 10 is a view showing a configuration of a duct according to a modified example.

Figure 11:
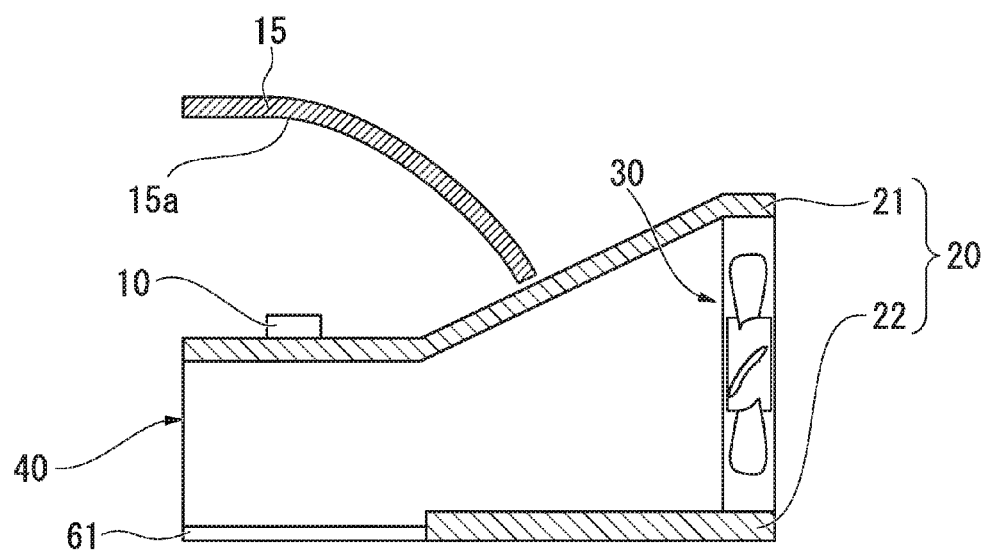

FIG. 11 is a view showing a configuration of the duct according to the modified example.

DESCRIPTION OF THE EMBODIMENTS

Hereinafter, a vehicle lighting apparatus according to an embodiment of the present invention is described with reference to the drawings. In the drawings used in the following description, there may be a case in which, for ease of understanding the features, the featured part is shown to be enlarged, and the dimension ratio of each component or the like is not always the same as an actual one.

In the present embodiment, an example of a reflector-type vehicle lighting apparatus configured to form a high beam light distribution pattern is described. The vehicle lighting apparatus of the present embodiment is used to improve long-distance visibility, for example, by being lighted in addition to a high illumination band of a usual high beam.

Figure 1:
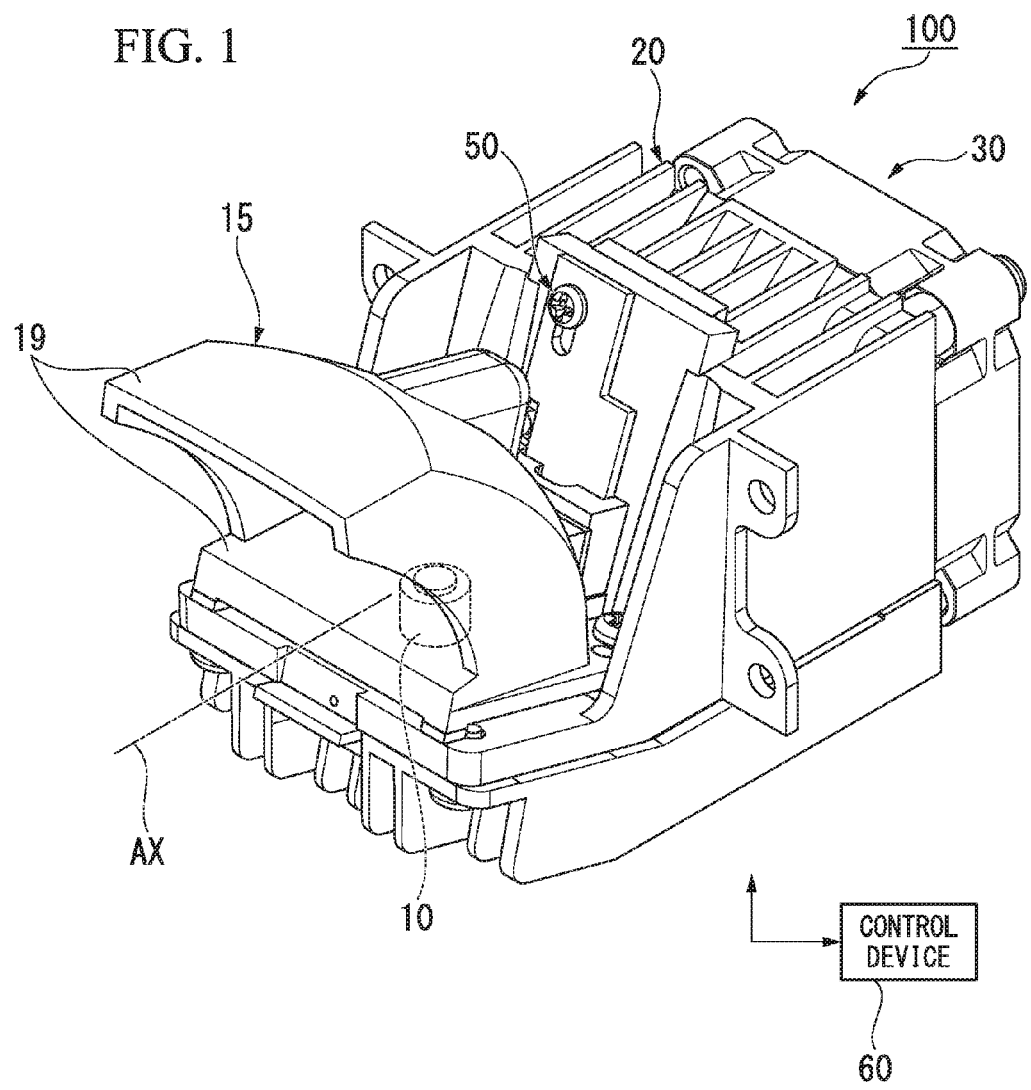
FIG. 1 is a perspective view showing a configuration of a vehicle lighting apparatus.

FIG. 1 is a perspective view showing a configuration of a vehicle lighting apparatus 100 of the present embodiment. Part (a) of FIG. 2 is a plan view of the vehicle lighting apparatus 100 seen from the above. Part (b) of FIG. 2 is a lateral view showing the vehicle lighting apparatus 100. Part (c) of FIG. 2 is a front view showing a configuration of the vehicle lighting apparatus 100.

In the drawings used to describe the present embodiment, there may be a case in which an XYZ coordinate system is used as a three-dimensional orthogonal coordinate system. Hereinafter, in the XYZ coordinate system, an X-axis direction is a direction parallel to an optical axis of the vehicle lighting apparatus 100, a Y-axis direction is a direction parallel to a right-to-left direction of a vehicle on which the vehicle lighting apparatus 100 is provided, and a Z-axis direction is a direction perpendicular to the X-axis direction and to the Y-axis direction. Further, there may be also a case in which the X-axis direction is referred to as a vehicle front-to-rear direction, the Y-axis direction is referred to as a vehicle right-to-left direction, the Z-axis direction is referred to as a vehicle vertical direction, the +X direction is referred to as a vehicle frontward direction, the −X direction is referred to as a vehicle rearward direction, the +Z direction is simply referred to as an upward direction, and the −Z direction is referred to as a downward direction.

As shown in FIG. 1 and FIG. 2, the vehicle lighting apparatus 100 of the present embodiment includes a light source device 10, a reflector (reflection member) 15, a light shield member 19, a heat sink (heat release member) 20, an air blow fan (air blow device) 30, a duct 40 (refer to FIG. 5), a light detection device 50, and a control device 60. The control device 60 is formed of, for example, a control circuit such as an ECU and controls each constituent element (for example, the light source device 10, the light detection device 50) of the vehicle lighting apparatus 100 as described later.

FIG. 3 is a cross-sectional view showing a schematic configuration of the light source device 10.

As shown in FIG. 3, the light source device 10 includes a semiconductor laser 10a that emits laser light, a wavelength conversion member 10b that absorbs at least part of the laser light L from the semiconductor laser 10a and converts the wavelength of the absorbed part of the laser light L, and a condenser lens 10c that condenses the laser light L on the wavelength conversion member 10b.

The semiconductor laser 10a is, for example, a so-called can-type semiconductor laser light source in a package in which a semiconductor laser element that emits laser light and a collimator lens that parallelize light emitted from the semiconductor laser element are provided.

As the semiconductor laser element, for example, a laser diode having a blue emission wavelength of light (about 450 nm) and the like can be used. The emission wavelength of the semiconductor laser element is not limited to the blue wavelength (about 450 nm).

The wavelength conversion member 10b includes, for example, a phosphor layer. The phosphor layer is formed of, for example, a composite (sintered body) of alumina $Al_2O_3$ and YAG into which an activator such as cerium Ce is introduced.

Part of the laser light L emitted from the semiconductor laser 10a is absorbed by the wavelength conversion member 10b to thereby be converted into yellow fluorescence YL. The rest of the laser light L emitted from the semiconductor laser 10a is transmitted through the wavelength conversion member 10b and is emitted as blue light BL. When the blue light BL is transmitted through the wavelength conversion member 10b, the blue light BL may be diffused by the wavelength conversion member 10b. The blue light BL is combined with the fluorescence YL to thereby generate white light WL. The upper surface of the wavelength conversion member 10b constitutes a light emission part 9 that emits the white light L.

The light source device 10 uses the semiconductor laser 10a, and therefore, the temperature of the light source device 10 becomes higher due to heat generation compared to that of a light source which uses a light emitting diode. Therefore, it is necessary to efficiently reduce the heat of the light source device 10. The light source device 10 of the present embodiment releases the heat generated at the light source device 10 by using the heat sink 20 described later, and thereby, the heat of the semiconductor laser 10a is reduced.

The white light WL emitted from the light source device 10 is incident on the reflector 15. The reflector 15 reflects the light WL from the light source device 10 in the vehicle frontward direction. The light WL emitted from the reflector 15 is radiated frontward and forms a fundamental light distribution pattern (high beam light distribution pattern) on a virtual vertical screen.

FIG. 4 is an exploded perspective view of the vehicle lighting apparatus 100.

As shown in FIG. 4, the light source device 10 is attached via an attachment plate 11 to the heat sink 20. The attachment plate 11 is fixed with light source device 10 to the heat sink 20 by two screw members 12. A heat conduction member 13 is arranged between the light source device 10 and the heat sink 20. The heat conduction member 13 is formed of, for example, grease or the like and reduces the heat resistance between the light source device 10 and the heat sink 20 by increasing the contact area between the light source device 10 and the heat sink 20. Thereby, the heat of light source device 10 is well transmitted to the heat sink 20.

The reflector 15 is attached to the heat sink 20 by a screw member 16.

The air blow fan 30 is attached to the heat sink 20 by a screw member 31. The air blow fan 30 sends air to the heat sink 20 and thereby improves cooling performances of the heat sink 20. The air blow fan 30 is, for example, an axial flow fan. The air blow fan 30 is electrically connected to the control device 60 and is controlled to be driven.

FIG. 5 is a view of the vehicle lighting apparatus 100 seen from the vehicle backward direction. In FIG. 5, the illustration of the air blow fan 30 is omitted.

As shown in FIG. 5, the vehicle lighting apparatus 100 includes the duct 40 in which wind (air flow) generated by the air blow fan 30 is flowed. The duct 40 is provided between the light source device 10 and the air blow fan 30 and supplies the wind by the air blow fan 30 in the vehicle frontward direction from the vehicle rearward direction.

The size of the outer shape of a joint part with the air blow fan 30 in the duct 40 can be preferably equal to or greater than that of the outer shape of the air blow fan 30. The joint part with the air blow fan 30 in the duct 40 is a part indicated by a region S of FIG. 5. In the present embodiment, the size of the outer shape of the joint part 40a is substantially the same as the size of the outer shape of the air blow fan 30.

According to this configuration, substantially all the wind generated by the air blow fan 30 can be introduced into the duct 40, and therefore, the wind generated by the air blow fan 30 can be used without wasting the wind.

The duct 40 of the present embodiment has a ventilation port 41 (refer to FIG. 4) described later. The ventilation port 41 guides part of the wind that flows in the duct 40 to an upper space (space inside the reflector 15) as described later. The ventilation port 41 is positioned at a center part where the light source device 10 is arranged in the vehicle right-to-left direction of the duct 40.

In the present embodiment, part of the heat sink 20 serves also as a constituent component of the duct 40.

That is, the duct 40 of the present embodiment is formed of part of the heat sink 20. The detail of the duct 40 is described later.

With reference back to FIG. 4, the heat sink 20 includes a first member 21 and a second member 25. The first member 21 and the second member 25 are formed of a material having high heat release properties, for example, such as aluminum. The heat sink 20 of the present embodiment realizes a complex shape that serves also as the duct 40 (refer to FIG. 5) as described above by using a plurality of members (the first member 21 and the second member 25).

The first member 21 and the second member 25 are fixed to each other by a screw member 26. A heat conduction member 7 is arranged between the first member 21 and the second member 25. The heat conduction member 7 is formed of, for example, grease or the like and reduces the heat resistance between the first member 21 and the second member 25 by increasing the contact area between the first member 21 and the second member 25. Thereby, the heat of the light source device 10 is well transmitted to the second member 25 via the first member 21. That is, the heat of the light source device 10 is well transmitted to the entire heat sink 20.

Part (a) of FIG. 6 is a cross-sectional view on the A-A arrow line of part (c) of FIG. 2. Part (b) of FIG. 6 is a cross-sectional view on the B-B arrow line of part (c) of FIG. 2.

As shown in FIG. 4 and part (a) of FIG. 6, the first member 21 includes a pair of lateral plate parts 21a, a top panel part 21b, a light source support part 22 that supports the light source device 10, a detection device support part 23 that supports the light detection device 50, the ventilation port 41, and a plurality of fins 24.

The lateral plate parts 21a arranged in parallel with each other in the vehicle right-to-left direction are connected via the top panel part 21b to each other. The pair of lateral plate parts 21a and the top panel part 21b are constituent members of the duct 40.

The light source support part 22 is joined to the pair of lateral plate parts 21a and the top panel part 21b at a vehicle rear part (refer to FIG. 4 and part (b) of FIG. 6). The ventilation port 41 is positioned at a joint part with the top panel part 21b in the light source support part 22.

The detection device support part 23 is interposed between and held by the pair of lateral plate parts 21a, and the lower end part of the detection device support part 23 is joined to the top panel part 21b. The ventilation port 41 is positioned at a joint part with the top panel part 21b in the detection device support part 23.

As shown in FIG. 4, the light source support part 22 includes a screw hole part 22a used to attach the screw member 12 that fixes the attachment plate 11, a through hole 22b used to support the light source device 10, and a screw hole part 22c used to attach the screw member 16 that fixes the reflector 15.

A light source control circuit board 61 is fixed to the lower surface of the light source support part 22 by a screw member 62. Therefore, the plurality of fins 24 are not formed at a part, where the light source control circuit board 61 is arranged, of the lower surface of the light source support part 22.

The light source control circuit board 61 supplies electric power and a drive signal to the light source device 10. A thermistor (not shown) is mounted on the light source control circuit board 61 and is capable of measuring the temperature of the light source device 10 (semiconductor laser 10a). The light source control circuit board 61 is electrically connected to the control device 60. The control device 60 controls the light source device 10 to be driven via the light source control circuit board 61.

In the present embodiment, the light detection device 50 is fixed to the detection device support part 23 by a screw member 51. The detection device support part 23 includes a screw hole part 23a used to attach the screw member 51.

As shown in part (a) and part (b) of FIG. 6, the light source support part 22 is tilted by a predetermined angle with respect to a horizontal plane (XY plane) and is capable of maintaining the light source device 10 to be inclined by the predetermined angle in the vehicle backward direction with respect to the horizontal plane. The detection device support part 23 is arranged upward with respect to the light source support part 22. The detection device support part 23 has a shape in which the upper end part of the detection device support part 23 is tilted by a predetermined angle in the vehicle rearward direction (−X direction) with respect to the lower end part of the detection device support part 23.

In this way, the light detection device 50 that is supported on the detection device support part 23 is capable of well detecting a component in a predetermined angle of the light emitted from the light source device 10 that is supported on the light source support part 22.

The plurality of fins 24 are heat release fins used for efficiently discharging the heat generated at the light source device 10. The plurality of fins 24 is formed of a plate-shaped member that extends in the vehicle front-to-rear direction. The plurality of fins 24 is arranged in parallel with the pair of lateral plate parts 21a in the vehicle right-to-left direction (refer to FIG. 5). Part of the plurality of fins 24 connects between the top panel part 21b and the detection device support part 23.

As shown in FIG. 4, the second member 25 includes a bottom panel part 27, a pair of lateral plate parts 28, and a connection part 29. The bottom panel part 27 and the pair of lateral plate parts 28 form, with the first member 21, the duct 40. The connection part 29 is connected to an end part 28a in the vehicle frontward direction of the pair of lateral plate parts 28. The connection part 29 is joined to the lower surface of the light source support part 22 of the first member 21 via the heat conduction member 7 described above. A through hole 29a into which the screw member 26 is inserted is formed on the connection part 29.

A plurality of fins 34 are formed on the lower surface of the connection part 29. The plurality of fins 34 are heat release fins used for efficiently discharging the heat generated at the light source device 10. The fins 34 are plate-shaped members that extend in the vehicle front-to-rear direction. The fins 34 are arranged in parallel with the pair of lateral plate parts 28 in the vehicle right-to-left direction.

In the present embodiment, the connection part 29 has a recess 29c. The recess 29c avoids interference with the light source control circuit board 61 attached to the first member 21 (light source support part 22). The plurality of fins 34 are also formed on the lower surface of the recess 29c.

In the heat sink 20 of the present embodiment, although the fin 24 cannot be formed on the lower surface of the first member 21 since the light source control circuit board 61 is arranged at the lower surface of the first member 21, the fin 34 is provided on the lower surface of the connection part 29, and thereby, cooling performance below the light source device 10 is improved.

In the light source support part 22 of the present embodiment, a slope part 70 is formed at a position from the end part at the air blow fan 30 side to the vicinity immediately below the light source device 10. The slope part 70 has a shape that gently slopes downward from the end part at the air blow fan 30 side to the vicinity immediately below the light source device 10. The slope part 70 is formed to have a width that is substantially the same as the width of the light source device 10 in the Y-axis direction. The slope part 70 is not provided at a position where the light source device 10 is not present (refer to the B-B cross-sectional view of part (b) of FIG. 6). The effects provided by the slope part 70 are described later.

Next, a configuration of the duct 40 is described.

As shown in part (a) and part (b) of FIG. 6, the top panel part 21b that constitutes part (upper surface part) of the inner surface of the duct 40 extends diagonally upward from the light source device 10 side toward the air blow fan 30 side. On the other hand, the bottom panel part 27 that constitutes part (lower surface part) of the inner surface of the duct 40 is a horizontal plane from the light source device 10 side toward the air blow fan 30 side.

The duct 40 of the present embodiment has a taper shape in which a flow passage R is broadened toward the reflector 15 side (upper side of the light source device 10). Therefore, the duct 40 can be arranged at a space made on the vehicle rearward side of the reflector 15, and it is possible to prevent the size in the vertical direction of the apparatus configuration from being increased.

In the present embodiment, the plurality of fins 24 are arranged in the duct 40. Therefore, a plurality of flow passages R partitioned by the fins 24, the top panel part 21b, and the bottom panel part 27 are formed in the duct 40 (refer to FIG. 5).

In the present embodiment, the fins 24 form the flow passages R, and therefore, the heat of the first member 21 can be efficiently discharged by air that flows in the flow passages R.

The height (height in the Z-axis direction) of the flow passage R of the duct 40 on the light source device 10 side is smaller than the height (height in the Z-axis direction) of the flow passage R on the air blow fan 30 side. That is, the cross-sectional area of the flow passage R of the duct 40 on the light source device 10 side is smaller than the cross-sectional area of the flow passage R on the air blow fan 30 side. The slope part 70 provided at the light source support part 22 is similarly formed such that the height (height in the Z-axis direction) of the flow passage R of the duct 40 on the light source device 10 side is smaller than the height (height in the Z-axis direction) of the flow passage R on the air blow fan 30 side.

In the present embodiment, the flow passage R has a taper shape, and the cross-sectional area of the flow passage R is gradually changed. According to this configuration, the cross-sectional area of the flow passage R is gradually changed, and thereby, a pressure loss in the duct 40 can be reduced, and air can be smoothly flowed.

The flow of the air delivered in the flow passage R of the duct 40 includes a diagonally downward flow along the top panel part 21b toward the light source device 10 and a flow along the bottom panel part 27 toward the light source device 10 (refer to part (a) and part (b) of FIG. 6).

In the present embodiment, since the cross-sectional area of the flow passage R is decreased toward the light source device 10, when the flow amount of the air that flows in the duct 40 is substantially constant, the wind speed is faster at a position closer to the light source device 10 with respect to the flow of the air in the flow passage R. The air that flows in the duct 40 flows into the reflector 15 (above the light source device 10) via the ventilation port 41 and passes in the vicinity of the light source device 10 (refer to part (b) of FIG. 6).

FIG. 7 and FIG. 8 are views showing a simulation result of a wind speed distribution in the flow passage R of the duct 40. The region surrounded by a contour line has the same wind speed in FIG. 7 and FIG. 8.

FIG. 7 is a view corresponding to a cross-sectional position of part (a) of FIG. 6. FIG. 8 is a view corresponding to a cross-sectional position of part (b) of FIG. 6.

It is confirmed from FIG. 7 and FIG. 8 that as the position of the air delivered into the duct 40 by the air blow fan 30 is closer to the light source device 10, the wind speed of the air that flows in the duct 40 is faster. Specifically, it is found from FIG. 8 that the wind speed is significantly faster toward the light source device 10 at a position where the ventilation port 41 is not arranged. It is confirmed from FIG. 7 that the flow of the air that flows in the duct 40 is branched via the ventilation port 41 to thereby flow into the reflector 15 (above the light source device 10) and pass in the vicinity of the light source device 10.

Therefore, according to the vehicle lighting apparatus 100 of the present embodiment, the wind speed of the air that flows in the duct 40 is faster at a position closer to the light source device 10, and therefore, air having a high wind speed can be supplied to a region below the light source device 10 where an output port of the duct 40 is positioned. Since the plurality of fins 34 are arranged below the light source device 10, the heat of the second member 25 is efficiently discharged via the plurality of fins 34. Since the second member 25 is thermally connected to the first member 21 that supports the light source device 10, it is possible to efficiently discharge the heat generated at the light source device 10. Accordingly, the heat sink 20 can efficiently release the heat generated at the light source device 10.

The air that flows into the reflector 15 directly cools the light source device 10 by the ventilation port 41, and therefore, it is possible to efficiently reduce the heat generated at the light source device 10 along with the heat sink 20.

FIG. 9 is a cross-sectional view showing a main part configuration in the vicinity of the reflector 15.

As shown in FIG. 9, the reflector 15 includes a reflection surface 15a that reflects light from the light source device 10 toward the vehicle frontward direction. The reflection surface 15a is a reflection surface configured to reflect the light from the light source device 10 and form a high beam light distribution pattern on the virtual vertical screen that confronts the vehicle front surface.

In the present embodiment, the reflection surface 15a reflects the light from the light source device 10 as parallel light parallel to an optical axis AX.

In the present embodiment, the X-axis direction parallel to the optical axis AX is a light emission direction of reflection light (parallel light) by the reflector 15.

The light source device 10 can be a state in which the wavelength conversion member 10b, for example, comes off or is missing. In this case, there is a possibility that laser light from the light source device 10 is incident directly on the reflector 15 and is externally emitted.

On the other hand, a through hole H is formed on the reflector 15 of the present embodiment at part of the reflection surface 15a on which the laser light from the light source device 10 is directly incident as described above. The size of the through hole H is appropriately determined based on the angle of divergence of the laser light emitted from the light source device 10 in a state where the wavelength conversion member 10b comes off (or is missing), the distance from the wavelength conversion member 10b to the reflector 15, the attachment tolerance of the reflector 15 or the light source device 10, and the like.

According to this configuration, when the wavelength conversion member 10b comes off (or is missing) in the light source device 10, the laser light emitted from the light source device 10 in a state where the wavelength conversion member 10b comes off (or is missing) passes through the through hole H formed on the reflection surface 15a. Accordingly, it is possible to prevent the laser light emitted from the light source device 10 in a state where the wavelength conversion member 10b comes off (or is missing) from being reflected at the reflection surface 15a and thereby being externally emitted.

In the present embodiment, a shield member 17 made of black metal that blocks the laser light which has passed through the through hole H is arranged outside the reflection surface 15a.

The vehicle lighting apparatus 100 of the present embodiment has a light shield member 19 used to block light which is emitted in the vehicle frontward direction from the light source device 10 and which is not incident on the reflector 15. There is a possibility that the light which is emitted in the vehicle frontward direction and which is not incident on the reflector 15 is directly incident on a human eye positioned in the vehicle frontward direction. That is, the light shield member 19 is a member having a function such that the light emission part 9 of the light source device 10 does not directly come into visual contact from the vehicle frontward.

In the present embodiment, the light shield member 19 is formed integrally with the reflector 15. The light shield member 19 includes an upper light shield member 19a and a lower light shield member 19b.

The upper light shield member 19a is provided at an end part in the vehicle frontward direction of the reflection surface 15a of the reflector 15. The upper light shield member 19a is arranged at a position where the upper light shield member 19a blocks light (light indicated by a reference numeral L1 in FIG. 9) which is emitted from the light emission part 9 of the light source device 10 and which is not incident on the reflection surface 15a and where the upper light shield member 19a does not block reflection light from the reflection surface 15a.

The lower light shield member 19b is arranged below the upper light shield member 19a, on the vehicle rearward side of the upper light shield member 19a, and in the vicinity of the light source device 10. The lower light shield member 19b is arranged at a position where the lower light shield member 19b blocks light (light indicated by a reference numeral L2 in FIG. 9) which is emitted from the light emission part 9 of the light source device 10 and which is not incident on the reflection surface 15a and where the lower light shield member 19b does not block reflection light from the reflection surface 15a.

The light detection device 50 includes a light detection part 52 arranged on the vehicle rearward side of the reflector 15. The light detection part 52 detects part of the light emitted from the light source device 10 via an opening (first opening) 15b provided on the reflector 15. The opening 15b is formed at a position where the opening 15b faces the light detection part 52 in the reflector 15. As the light detection part 52, for example, a photodiode can be used.

In the present embodiment, part of the light emitted from the light source device 10 is directly detected by the light detection part 52 that is arranged at the vehicle rearward positon of the reflector 15, and therefore, it is unnecessary to form an optical system such as a reflection surface on the reflector 15 as in a case in which a photodiode is arranged at a vehicle frontward positon of the reflector 15. Accordingly, the size of the reflector 15 can be reduced, and therefore, the size of the vehicle lighting apparatus 100 can be reduced.

The light detection device 50 is electrically connected to the control device 60 and transmits a detection result to the control device 60. The control device 60 controls the light source device 10 to be driven based on the detection result of the light detection device 50.

As shown in FIG. 9, the light detection part 52 is arranged at a more vehicle rearward position of the light source device 10 than the lower light shield member 19b (light shield member 19) in the light emission direction (optical axis AX direction) by the reflector 15 and is arranged at a lower position than the light shield member 19.

In the light source device 10, the light emitted from the light emission part 9 has a Lambertian light distribution, and therefore, the light amount is decreased as an angle θ (hereinafter, also referred to as a light emission angle θ) with respect to a normal direction of the light emission part 9 is increased. That is, the light amount of the light emitted from the light emission part 9 is maximized at the normal direction (light emission angle θ=0°) and is decreased as the light emission angle θ is increased.

In the present embodiment, the light detection part 52 detects light (light indicated by a reference numeral L3 in FIG. 9) having a light emission angle θ of 75° to 85° among the light emitted from the light emission part 9. In the present embodiment, for example, light having a light emission angle θ of 80° is detected.

In the present embodiment, the reflection surface 15a of the reflector 15 reflects light in a direction that is substantially parallel to the optical axis AX. However, in the present embodiment, as described above, the light source support part 22 is tilted by a predetermined angle with respect to a horizontal plane (XY plane), and the light source device 10 is maintained to be inclined by the predetermined angle in the vehicle backward direction with respect to the horizontal plane. Therefore, even if the light (light having an angle of 75° to 85°) having the above-described light emission angle θ is reflected at the reflection surface 15a, the light is blocked by the light shield member 19 that is tilted together with the light source support part 22. Therefore, the light having the above-described light emission angle θ cannot be radiated frontward as desired light (light substantially parallel to the optical axis AX) and cannot be used as a fundamental light distribution pattern (high beam light distribution pattern). That is, the light having the above-described light emission angle θ is used for detection at the light detection part 52, and thereby, it is possible to effectively use light that cannot be used as a fundamental light distribution pattern (high beam light distribution pattern) without affecting the light amount of the fundamental light distribution pattern.

In the present embodiment, the light detection part 52 is supported by the first member 21 (detection device support part 23) of the heat sink 20. Thereby, the light detection part 52 is arranged at a position away from the reflector 15, and the impact of light (for example, disturbance light such as sunlight and light from an oncoming vehicle or the like) other than the light emitted from the light source device 10 is reduced.

Further, in the present embodiment, the lower light shield member 19b is arranged at a vehicle frontward position of the opening 15b in the light emission direction (optical axis AX direction) of the reflector 15 and is arranged at an upper position than the opening 15b in the vertical direction. Therefore, the lower light shield member 19b can prevent disturbance light from being directly incident on the light detection part 52.

The light detection device 50 further includes a cover member 53 that covers the light detection part 52. The cover member 53 has an opening (second opening) 53a through which part of the light from the light source device 10 is transmitted to be incident on the light detection part 52. The cover member 53 blocks the disturbance light, and therefore, the S/N ratio of the photodiode (light detection part 52) can be improved.

The light detection device 50 may further include an optical filter between the opening 53a and the light detection part 52. As the optical filter, for example, it is possible to use a bandpass filter that transmits only part of the light (yellow fluorescence YL obtained by wavelength conversion at the wavelength conversion member 10b) from the light source device 10 via the opening 53a and that does not transmit the rest of the light. In this way, it is possible to prevent light (for example, disturbance light such as sunlight and light from an oncoming vehicle or the like) other than the fluorescence YL from being incident on the light detection part 52, and therefore, the S/N ratio of the photodiode (light detection part 52) can be further improved.

As the light detection part 52, a photodiode designed to have a narrow light detection angle may be used. In this way, the impact of disturbance light can be reduced, and the detection accuracy of the light detection part 52 can be improved.

Next, an operation of the vehicle lighting apparatus 100 of the present embodiment is described.

The following process is performed by the control device 60 formed of a control circuit such as an ECU.

The control device 60 drives the light source device 10 via the light source control circuit board 61. Thereby, the light source device 10 emits white light WL from the light emission part 9. The light WL emitted from the light emission part 9 is reflected at the reflection surface 15a of the reflector 15, is radiated frontward, and forms a fundamental light distribution pattern (high beam light distribution pattern) on a virtual vertical screen.

At this time, the semiconductor laser 10a generates heat, and thereby, the temperature of the light source device 10 rises. The heat of the light source device 10 is transmitted directly to the heat sink 20 (first member 21) or indirectly via the attachment plate 11. The heat transmitted to the first member 21 is transmitted to the second member 25.

In this way, the heat of the light source device 10 is spread to the entire heat sink 20. The first member 21 releases heat via the plurality of fins 24, and the second member 25 releases heat via the plurality of fins 34.

In the present embodiment, the control device 60 drives the air blow fan 30 concurrently when the light source device 10 is driven. The air flow by the air blow fan 30 passes through the flow passage R formed at the duct 40 and flows to a region below the light source device 10. The flow passage R of the present embodiment is partitioned by the plurality of fins 24, and therefore, air that flows in the flow passage R comes into good contact with the plurality of fins 24. Accordingly, it is possible to efficiently release heat of the first member 21.

The temperature of the heat sink 20 in the vicinity of the light source device 10 becomes extremely high. In the present embodiment, the cross-sectional area of the flow passage R is decreased toward the light source device 10, and therefore, the flow rate of air that flows in the flow passage R is faster at a position closer to the light source device 10. Accordingly, air having a high flow rate is supplied to a space between the fins 34 arranged at a region below (in the vicinity of) the light source device 10 where an output port of the duct 40 is positioned. Accordingly, the heat of the second member 25 is efficiently discharged via the plurality of fins 34. Since the second member 25 is thermally connected to the first member 21 that supports the light source device 10, the second member 25 efficiently discharges the heat generated at the light source device 10. The heat generated at the light source device 10 is efficiently released by the heat sink 20. Accordingly, it is possible to efficiently cool the light source device 10.

In the present embodiment, part of the air that flows in the duct 40 flows into the reflector 15 via the ventilation port 41 and directly cools the light source device 10. Therefore, it is possible to efficiently reduce heat of the light source device 10.

Part of the light (fluorescence YL) emitted from the light emission part 9 of the light source device 10 is detected by the light detection part 52. The light detection part 52 transmits a detection result to the control device 60. The control device 60 determines a light irradiation state at the light source device 10 based on the result transmitted from the light detection part 52. For example, when the detection result by the light detection part 52 is normal (that is, when fluorescence YL is detected), the control device 60 determines that the light source device 10 is normal and controls the semiconductor laser 10a to be driven such that the laser light L is continuously radiated.

There may be a case in which the wavelength conversion member 10b comes off (or is missing) during emission of laser light L by the semiconductor laser 10a. Hereinafter, an operation example (control example of the semiconductor laser 10a) of the vehicle lighting apparatus 100 when the wavelength conversion member 10b comes off (or is missing) during emission of laser light L by the semiconductor laser 10a is described.

When the wavelength conversion member 10b comes off (or is missing), fluorescence YL is not incident on the light detection part 52. When the light detection part 52 does not detect the fluorescence YL, the control device 60 determines that the wavelength conversion member 10b comes off (or is missing) or that the light detection part 52 breaks down and controls the semiconductor laser 10a such that the laser light L is not emitted.

Thereby, when the wavelength conversion member 10b comes off (or is missing), it is possible to prevent the laser light L emitted from the light source device 10 in a state where the wavelength conversion member 10b comes off (or is missing) from being reflected at the reflection surface 15a of the reflector 15 and being externally emitted. Accordingly, it is avoided that the laser light is directly incident on a human eye positioned in the vehicle frontward direction.

When the wavelength conversion member 10b comes off (or is missing), the laser light L emitted from the light source device 10 in a state where the wavelength conversion member 10b comes off (or is missing) passes through the through hole H formed on the reflection surface 15a as shown in FIG. 9. Therefore, even if time is required before the semiconductor laser 10a is controlled such that the laser light L is not emitted, it is possible to prevent the laser light L emitted from the light source device 10 in a state where the wavelength conversion member 10b comes off (or is missing) from being reflected at the reflection surface 15a and being radiated frontward.

When the time required for controlling the semiconductor laser 10a to discontinue emitting the laser light L can be made a short time that satisfies the required safety level, the through hole of the reflection surface 15a may be omitted.

As described above, according to the present embodiment, the light from the light source device 10 is directly detected by the light detection part 52 that is arranged at a vehicle rearward positon of the reflector 15, and therefore, it is possible to prevent the size of the reflector 15 from being increased compared to a configuration in which a photodiode is arranged at a vehicle frontward positon of the reflector 15. Accordingly, it is possible to reduce the size of the vehicle lighting apparatus 100 including the reflector 15.

In the present embodiment, the light detection part 52 uses, for detection, light (light having a light emission angle θ of 70 to 85°) that cannot be used as a fundamental light distribution pattern even if the light is reflected at the reflector 15, and therefore, it is possible to effectively use light without affecting the light amount of the fundamental light distribution pattern.

In the present embodiment, the light detection part 52 is covered by the cover member 53, and the detection by the light detection part 52 is performed via the opening 53a that is provided at the cover member 53. Therefore, the S/N ratio of the light detection part 52 can be improved.

According to the vehicle lighting apparatus 100 of the present embodiment, air can be supplied at a high wind speed to a region below (in the vicinity of) the light source device 10 using the duct 40. Therefore, it is possible to efficiently cool the light source device 10 that includes the semiconductor laser 10a to thereby become high temperatures.

Since the cross-sectional area of the flow passage R of the duct 40 is gradually changed, air smoothly flows in the flow passage R. Therefore, it is possible to efficiently cool the light source device 10.

The duct 40 of the present embodiment can supply air to a region above the light source device 10 according to the ventilation port 41 in addition to a region below the light source device 10. Thereby, it is possible to directly cool the light source device 10. Accordingly, in the present embodiment, cooling by air blow is performed in addition to cooling by the heat sink 20, and therefore, it is possible to efficiently cool the light source device 10.

In the present embodiment, substantially all the air generated by the air blow fan 30 is supplied in the duct 40, and therefore, it is possible to efficiently use the air generated by the air blow fan 30.

According to the vehicle lighting apparatus 100 of the present embodiment, the air blow fan 30 is arranged at a vehicle rearward position of the heat sink 20, and therefore, the size in the vertical direction of the apparatus configuration can be reduced compared to a case where the air blow fan 30 is arranged at a lower position in the vertical direction with respect to the light source device 10.

In the present embodiment, part of the heat sink 20 serves also as the duct 40, and therefore, it is possible to reduce the number of components to thereby reduce costs and reduce the size. The heat sink 20 of the present embodiment is formed by using a plurality of members (the first member 21 and the second member 25), and therefore, the heat sink 20 can also conform to a complex shape that serves as the duct 40.

The heat sink 20 of the present embodiment includes the plurality of fins 24, and therefore, it is possible to efficiently discharge the heat of the light source device 10 according to the air supplied from the air blow fan 30.

In the present embodiment, light emitted backward and diagonally upward from the light source device 10 (light that cannot be used as a fundamental light distribution pattern) is incident on the photodiode (light detection device 50), and therefore, the usage efficiency of light of the light source device 10 can be enhanced.

In the present embodiment, based on the detection result of the light detection device 50, the semiconductor laser 10a is controlled such that laser light is not emitted. Therefore, when the wavelength conversion member 10b comes off (or is missing), it is possible to prevent the laser light L emitted from the light source device 10 in a state where the wavelength conversion member 10b comes off (or is missing) from being reflected at the reflector 15 and being externally emitted.

In the present embodiment, even if time is required before the semiconductor laser 10a is controlled such that laser light is not emitted, laser light emitted from the light source device 10 in a state where the wavelength conversion member 10b comes off (or is missing) passes through the through hole H, and therefore, it is possible to prevent the laser light from being reflected at the reflection surface 15a and being externally emitted.

In the present embodiment, light (for example, disturbance light such as sunlight and light from an oncoming vehicle or the like) other than the light emitted from light source device 10 is blocked by the cover member 53, and therefore, the S/N ratio of the photodiode (light detection part 52) can be improved.

The present invention is not limited to the embodiments described above, and various changes can be made without departing from the scope of the invention.

For example, the above embodiment is described using an example in which the top panel part 21b is arranged to be tilted relative to the bottom panel part 27 to thereby form a flow passage R of which the cross-sectional area is changed; however, the shape of the flow passage R is not limited thereto. For example, the bottom panel part 27 may be tilted diagonally upward from the air blow fan 30 toward the light source device 10 to thereby form a flow passage R having a cross-sectional area that is decreased toward the light source device 10.

The arrangement of the fins 24 in the duct 40 may be devised, that is, the arrangement of the fins 24 in the duct 40 may be changed between the air blow fan 30 and the light source device 10 to thereby improve the wind speed in the vicinity of the light source device 10.

FIG. 10 is a view conceptually showing a configuration in which the number of fins 40A is differentiated in the duct 40. In FIG. 10, the right side is an upstream side (air blow fan 30 side), and the left side is a downstream side (light source device 10 side).

In the configuration shown in FIG. 10, the number of fins 24A arranged in the duct 40 is increased toward the downstream between the air blow fan 30 and the light source device 10. The fins 24A are formed on the first member 21.

Specifically, the number of fins 24A arranged in the vehicle width direction is three, five, and nine from the upstream toward the downstream in the duct 40. That is, the interval between the fins 24A is narrowed from the upstream toward the downstream in the duct 40. The flow passage R partitioned by the fins 24A is formed in the duct 40. In FIG. 10, a region interposed between a pair of fins 24A corresponds to the flow passage R.

As shown in the arrow in FIG. 10, in the duct 40, air is branched sequentially in the process in which the air flows from the upstream to the downstream (flows from the vehicle rearward part to the vehicle frontward part) and flows through the flow passages R. Therefore, when the downstream part is compared with the upstream part, the cross-sectional area of the flow passage R in the duct 40 through which the air indicated by the arrow flows is relatively decreased. Accordingly, even in the configuration shown in FIG. 10, the flow rate of the air that flows in the duct 40 is increased toward the downstream. Therefore, similarly to the above embodiment, the wind speed in the vicinity of the light source device 10 is made fast, and thereby, it is possible to efficiently cool the light source device 10.

The above embodiment is described using an example in which air is blown such that the air is directed from the vehicle rearward to the vehicle frontward in the flow passage R using the air blow fan 30; however, the present invention is not limited thereto. For example, the air blow direction by the air blow fan 30 may be inverted. That is, air may be blown such that the air is directed from the vehicle frontward to the vehicle rearward in the flow passage R using the air blow fan 30. In this case, an air flow toward the vehicle rearward part through the flow passage R via the gap between the fins 34 is generated below the light source device 10. When the flow amount of the air that flows in the duct 40 is constant, since the cross-sectional area of the flow passage R close to the light source device 10 is relatively smaller than the cross-sectional area close to the air blow fan 30, the flow rate close to the light source device 10 is relatively faster than the flow rate close to the air blow fan 30. Accordingly, a flow having a high wind speed can be generated along the fin 34 positioned in the vicinity of the light source device 10, and therefore, similarly to the above embodiment, it is possible to efficiently cool the light source device 10.

The above embodiment is described using an example in which the duct 40 is formed by using the heat sink 20; however, the present invention is not limited thereto. For example, part of the duct 40 may be formed by using the light source control circuit board 61. Specifically, as shown in FIG. 11, part of the bottom panel part 27 of the second member 25 may be replaced by the light source control circuit board 61. FIG. 11 is a schematic view showing the shape of each member.

According to this configuration, the heat of the light source control circuit board 61 can also be released simultaneously by the flow of air that passes through the duct 40. The light source device 10 is electrically connected to the light source control circuit board 61 via a wiring at a region that is not shown in the drawing.

The invention claimed is:

1. A vehicle lighting apparatus comprising:
    a light source device that includes a semiconductor laser which emits laser light and a wavelength conversion member which converts a wavelength of at least part of the laser light and that emits, from a light emission part, light from the wavelength conversion member;
    a reflection member that reflects light emitted from the light emission part of the light source device in a vehicle frontward direction as parallel light;
    a light shield member that blocks light which is emitted in the vehicle frontward direction from the light emission part and which is not incident on the reflection member; and
    a light detection part that is arranged at a vehicle rearward position of the reflection member and detects part of the light emitted from the light emission part, wherein
    a first opening is formed on the reflection member at a position facing the light detection part, and a hole is formed on the reflection member at a position on which the laser light is directly incident in a case where the wavelength conversion member is missing,
    the light shield member has a first light shield member that is arranged at a more light emission direction position than the light emission part and that is provided in the vicinity of the light emission part such that the light emission part does not directly come into visual contact from a vehicle frontward direction, and
    the light detection part is arranged at a more vehicle rearward position of the light source device than the light shield member in a light emission direction in which the parallel light is emitted, is arranged at a lower position than the first light shield member, and detects, via the first opening, part of the light emitted from the light emission part.

2. The vehicle lighting apparatus according to claim 1, wherein
the light shield member further includes a second light shield member that is arranged at a vehicle frontward position of the first opening in the light emission direction and is arranged at an upper position than the first opening in a vertical direction that intersects with the light emission direction, the second light shield member being arranged on a frontward side of the reflection member.

3. The vehicle lighting apparatus according to claim 1, further comprising:
a cover member that covers the light detection part, wherein
a second opening that transmits part of the light emitted from the light emission part is formed on the cover member.

4. The vehicle lighting apparatus according to claim 1, wherein
the light detection part is arranged at a position on which, among the light emitted from the light emission part, light having an angle of 70 to 85° with respect to a normal direction of a light emission surface in the light emission part is incident.

5. The vehicle lighting apparatus according to claim 4, wherein
the light source device is maintained to be tilted by a predetermined angle in a vehicle rearward direction with respect to a horizontal plane.

6. The vehicle lighting apparatus according to claim 1, further comprising:
a heat release member that releases heat generated from the light source device, wherein
the light detection part is supported at a vehicle rearward position of the reflection member in the heat release member.

7. The vehicle lighting apparatus according to claim 1, further comprising:
a control device that controls the light source device to be driven based on a detection result of the light detection part.

8. The vehicle lighting apparatus according to claim 1, wherein
the light source device is maintained to be tilted by a predetermined angle in a vehicle rearward direction with respect to a horizontal plane.

9. A vehicle lighting apparatus comprising:
a light source device that includes a semiconductor laser which emits laser light and a wavelength conversion member which converts a wavelength of at least part of the laser light and that emits, from a light emission part, light from the wavelength conversion member;
a reflection member that reflects light emitted from the light emission part of the light source device in a vehicle frontward direction as parallel light;
a light shield member that blocks light which is emitted in the vehicle frontward direction from the light emission part and which is not incident on the reflection member;
a light detection part that is arranged at a vehicle rearward positon of the reflection member and detects part of the light emitted from the light emission part; and
a heat release member that releases heat generated from the light source device, wherein
the light detection part is supported at a vehicle rearward position of the reflection member in the heat release member,
a first opening is formed on the reflection member at a position facing the light detection part, and a hole is formed on the reflection member at a position on which the laser light is directly incident in a case where the wavelength conversion member is missing,
the light shield member has a first light shield member that is arranged at a more light emission direction position than the light emission part and that is provided in the vicinity of the light emission part such that the light emission part does not directly come into visual contact from a vehicle frontward direction,
the heat release member includes a first member that supports the light source device and a second member that supports the light detection part, and the first member and the second member are connected to each other via a connection part,
the second member serves also as a constituent component of a duct that is provided at a vehicle rearward position of the reflection member, and
the duct has a taper shape in which a flow passage is broadened toward the reflection member side.

10. The vehicle lighting apparatus according to claim 9, wherein
the heat release member has a ventilation port that is continued to the flow passage of the duct, the ventilation port being positioned at a center part, where the light source device is arranged, in a vehicle right-to-left direction of the duct.

11. The vehicle lighting apparatus according to claim 10, wherein
a heat release fin that partitions the flow passage of the duct is formed on the heat release member.

12. The vehicle lighting apparatus according to claim 9, wherein the light shield member further includes a second light shield member that is arranged at a vehicle frontward position of the first opening in the light emission direction and is arranged at an upper position than the first opening in a vertical direction that intersects with the light emission direction, the second light shield member being arranged on a frontward side of the reflection member.

13. The vehicle lighting apparatus according to claim 9, wherein the light detection part is arranged at a position on which, among the light emitted from the light emission part, light having an angle of 70 to 85° with respect to a normal direction of a light emission surface in the light emission part is incident.

14. The vehicle lighting apparatus according to claim 9, further comprising:
a control device that controls the light source device to be driven based on a detection result of the light detection part.

15. The vehicle lighting apparatus according to claim 9, wherein the light source device is tilted by a predetermined angle in a vehicle rearward direction with respect to a horizontal plane.

* * * * *